US00RE35030E

United States Patent [19]

Siemon et al.

[11] E Patent Number: Re. 35,030

[45] Reissued Date of Patent: Aug. 29, 1995

[54] WIRING BLOCK HAVING DETACHABLE LEG ASSEMBLIES

[75] Inventors: John A. Siemon, Woodbury; Howard Reynolds, Waterbury, both of Conn.

[73] Assignee: The Siemon Company, Watertown, Conn.

[21] Appl. No.: 297,499

[22] Filed: Aug. 29, 1994

Related U.S. Patent Documents

Reissue of:

[64] Patent No.: 5,312,270
Issued: May 17, 1994
Appl. No.: 934,923
Filed: Aug. 25, 1992

[51] Int. Cl.[6] ..... H01R 9/24

[52] U.S. Cl. ..... 439/532; 439/404; 439/49

[58] Field of Search ..... 439/532, 540, 716, 404, 439/491, 49; 379/325, 328, 329, 399

[56] References Cited

U.S. PATENT DOCUMENTS

| | | | |
|---|---|---|---|
| 3,501,736 | 3/1970 | Norris | 439/567 |
| 3,611,264 | 10/1971 | Ellis, Jr. | 439/404 |
| 3,641,474 | 2/1972 | Owens | 439/573 |
| 3,798,587 | 3/1974 | Ellis, Jr. et al. | 439/403 |
| 4,118,095 | 10/1978 | Berglund et al. | 439/403 |
| 4,493,524 | 1/1985 | Kaplan et al. | 439/573 |
| 4,964,812 | 10/1990 | Siemon et al. | 439/403 |
| 5,044,979 | 9/1991 | Siemon et al. | 439/404 |
| 5,083,941 | 1/1992 | Rodgers et al. | 439/532 |

FOREIGN PATENT DOCUMENTS

| | | | |
|---|---|---|---|
| 8204367 | 6/1984 | Netherlands | 439/491 |

*Primary Examiner*—Gary F. Paumen
*Attorney, Agent, or Firm*—Fishman, Dionne & Cantor

[57] ABSTRACT

A wiring block, in accordance with the present invention, comprises a base having at least one wiring strip snap lock mounted thereto and having a leg assembly snap lock mounted at each end of the base. The leg assemblies provide a space behind the wiring block (when mounted) for cables/wires that are to be terminated at the wiring block. The detachable leg assemblies are an important feature of the present invention as they provide for improved cable/wire management during installations, moves and changes, as compared to that of the prior art. The base has openings between selected wiring strips for allowing cables/wires to pass through also improving cable/wire management. Further, the wiring strip includes spaced notches to facilitate wiring thereto.

44 Claims, 9 Drawing Sheets

WIRING BLOCK HAVING DETACHABLE LEG ASSEMBLIES

Matter enclosed in heavy brackets [ ] appears in the original patent but forms no part of this reissue specification; matter printed in italics indicates the additions made by reissue.

BACKGROUND OF THE INVENTION

This invention relates generally to wiring blocks for use primarily in the communications industry. More specifically, this invention relates to a novel wiring block having removable legs and snap-in wiring strips.

Wire connecting systems of the type described herein are well known and commercially available from AT&T Technologies as the 110 connector system. The 110 type wiring systems are described in several prior patents including U.S. Pat. Nos. 3,611,264; 3,798,581 and 4,118,095. An AT&T Technologies 110A type wiring block comprises a base having integrally molded legs at each end thereof. The legs provide a space behind the wiring block (when mounted) for cables that are to be terminated on the wiring block. Further, each leg terminates at a respective foot, with each foot having a plurality of mounting holes therethrough. An upper surface of the base has a plurality of longitudinal slots with spaced mounting holes through the base. A wiring strip is secured in each of the slots by a plurality of posts extending from the lower surface of the strip through the mounting holes in the slots. The posts are heat staked to the base at its lower surface. The legs extend upwardly past the base and terminate at platforms. Opposing surfaces of each outer pair of the legs include a retaining edge for resiliently securing designation strips.

The 110A type wiring block suffers from several disadvantages and problems. The legs are permanently attached thereto and often obstruct wire/cable management during installations, moves and changes. Further, the heat staking of the wiring strips to the base is believed to increase assembly time and coal of the wiring block. The solid base of the 110A type wiring block restricts wire/cable layoul by limiting access to the wiring strips to the sides and ends of the wiring block.

The AT&T Technologies 110T type wiring block employs wiring strips which are snap lock mounted onto the base of the wiring block. This snap lock mounting feature is provided by a pair of resiliently deflectable arms extending upwardly from the lower end of the post extending downwardly from the lower surface of the wiring strip. The arms from each post are retained within corresponding openings in the base by retaining edges therein which engage the arms. The 110T type wiring block does not include integrally molded legs. However, a bracket having legs may be attached at the lower surface of the base.

The 110T type wiring block suffers from many of the same disadvantages as the 110A type wiring block. The bracket of the 110T type wiring block must be attached prior to wiring the block. Accordingly, this bracket also obstructs wire/cable management during installation. moves and changes. Further, the base of the 110T wiring block as well as the attaching surface of the bracket are solid, thereby restricting access to the wiring strips to entry from the sides and ends of the wiring block.

SUMMARY OF THE INVENTION

The above-discussed and other drawbacks and deficiencies of the prior art are overcome or alleviated by the wiring block of the present invention. In accordance with the present invention, the wiring block comprises a base having at least one wiring strip snap lock mounted thereto and having a leg assembly snap lock mounted at each end of the base. The leg assemblies provide a space behind the wiring block (when mounted) for cables/wires that are to be terminated at the wiring block. The detachable leg assemblies are an important feature of the present invention as they provide for improved cable/wire management during installations, moves and changes, as compared to that of the aforementioned prior art.

The base has openings between selected wiring strips for allowing cables/wires to pass through also improving cable/wire management. Further, the wiring strip includes spaced notches to facilitate wiring thereto. The prior art described hereinbefore is devoid of any teaching or suggestion of the above novel features.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIGS. 3A–C are views of a base of the wiring block of FIG. 2 wherein FIG. 3A is a top view thereof, FIG. 3B is an end view thereof, and FIG. 3C is a bottom view thereof;

FIG. 4A is a side elevational view thereof and FIG. 4B is a top view thereof;

FIGS. 5A–B are views of a leg assembly of the wiring block of FIG. 2 wherein FIG. 5A is a first end perspective view thereof and FIG. 5B is a second end perspective view thereof;

FIGS. 7A–C are views of a base of a wiring block in accordance with another embodiment of the present invention wherein FIG. 7A is a top view thereof, FIG. 7B is an end view thereof, and FIG. 7C is a side elevational view thereof;

DESCRIPTION OF THE PREFERRED EMBODIMENT

Figure 1:
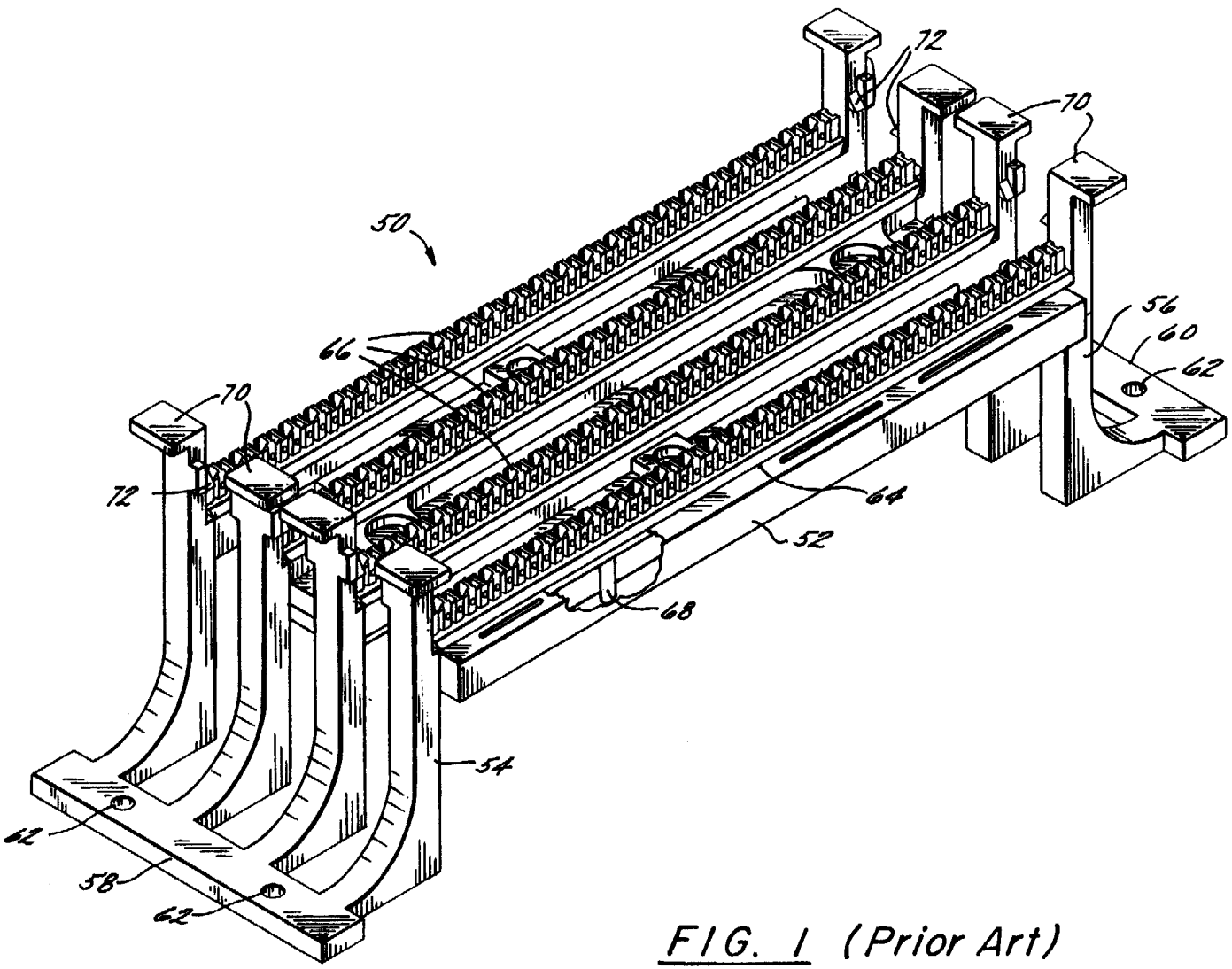
FIG. 1 (Prior Art)
FIG. 1 is a perspective partially broken away view of a wiring block m accordance with the prior art.

Referring to prior art FIG. 1, an AT&T Technologies 110A type wiring block is shown generally at 50. Wiring block 50 comprises a base 52 having integrally molded legs 54 and 56 at each end thereof. Legs 54 and 56 provide a space behind wiring block 50 (when mounted) for cables that are to be terminated on wiring block 50. Further, legs 54 and 56 each terminate at a mounting member 58 and 60, respectively, with each member having a plurality of mounting holes 62 therethrough. An upper surface 64 of base 52 has a plurality of longitudinal slots with spaced mounting holes through base 52. A wiring strip 66 is secured in each of the slots by a plurality of posts 68 extending from the lower surface of strip 66 through the mounting holes in the slots. Posts 68 are heat staked to base 52 at its lower surface. Legs 54 and 56 extend upwardly past base 52 and terminate at platforms 70. Opposing surfaces of each outer pair of legs 54 and 56 include a retaining edge 72 for resiliently securing designation strips (not shown).

The 110A type wiring block 50 suffers from several disadvantages and problems. The legs 54 and 56 are permanently attached thereto and often obstruct wire/-cable management during installations, moves and changes. Further, the heat staking of the wiring strips 66 to base 52 is believed to increase assembly time of the wiring block 50. The solid base 52 of tile 110A type wiring block 50 restricts wire/cable layout by limiting access to the wiring strips 66 to entry from the sides and ends of wiring block 50.

Figure 2:
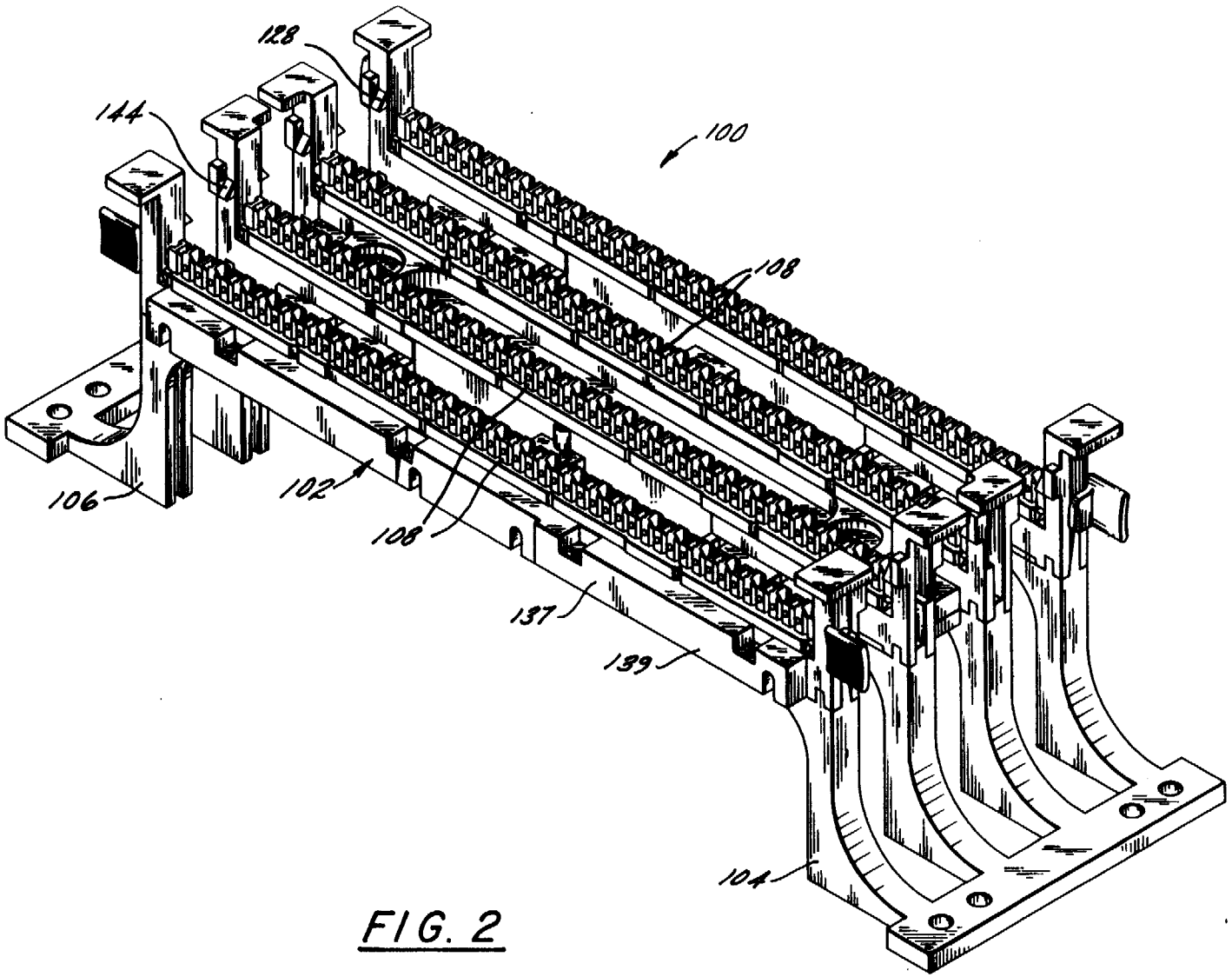
FIG. 2 is a perspective view of a wiring block in accordance with the present invention.

Referring to FIG. 2, a wiring block in accordance with the present invention is shown generally at 100. Wiring block 100 comprises a base 102 having a first leg assembly 104 removably attached at one end of base 102 and a second leg assembly 106 removably attached at the other end of base 102. A Plurality of wiring strips 108 are snap took mounted onto base 102 at one surface thereof. While four wiring strips 108 are shown in FIG. 2, it is contemplated by the present invention that any number of wiring strips may be employed with an appropriate base. It is an important feature of the present invention that leg assemblies 104 and 106 are removably attached to base 102.

Figure 3A:
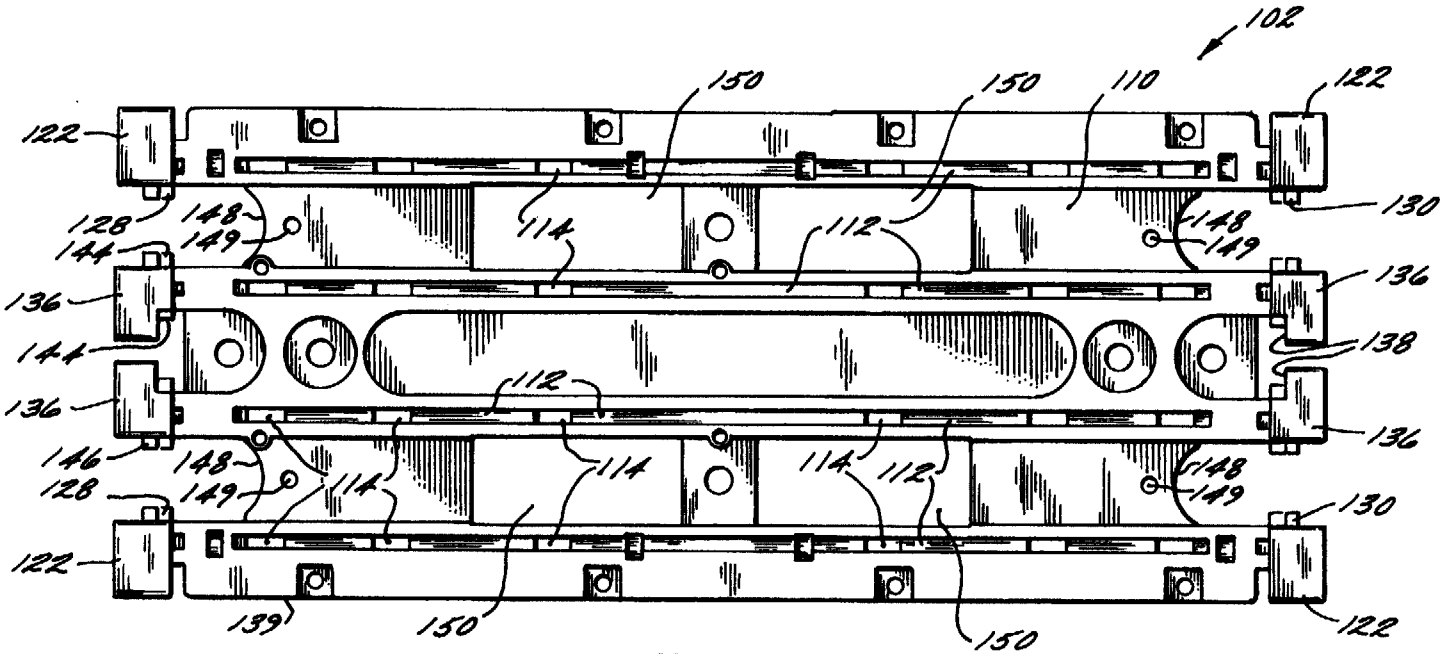
Figure 3B:
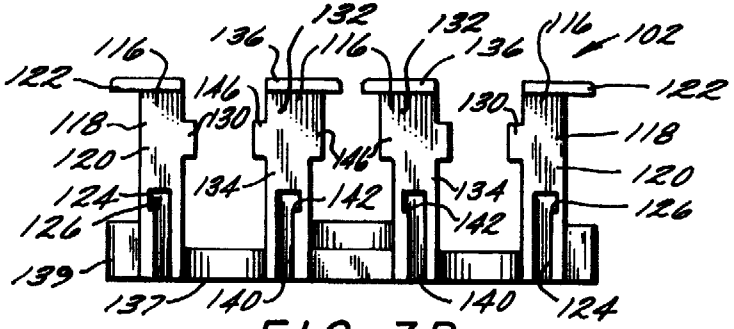
Figure 3C:
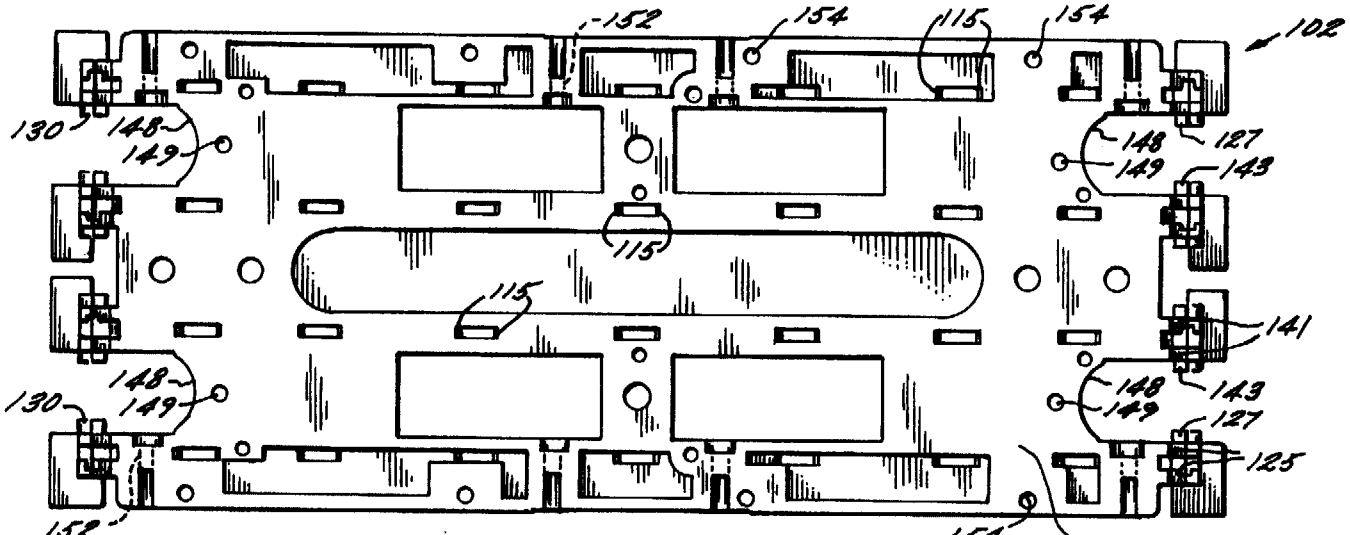
Figure 6:
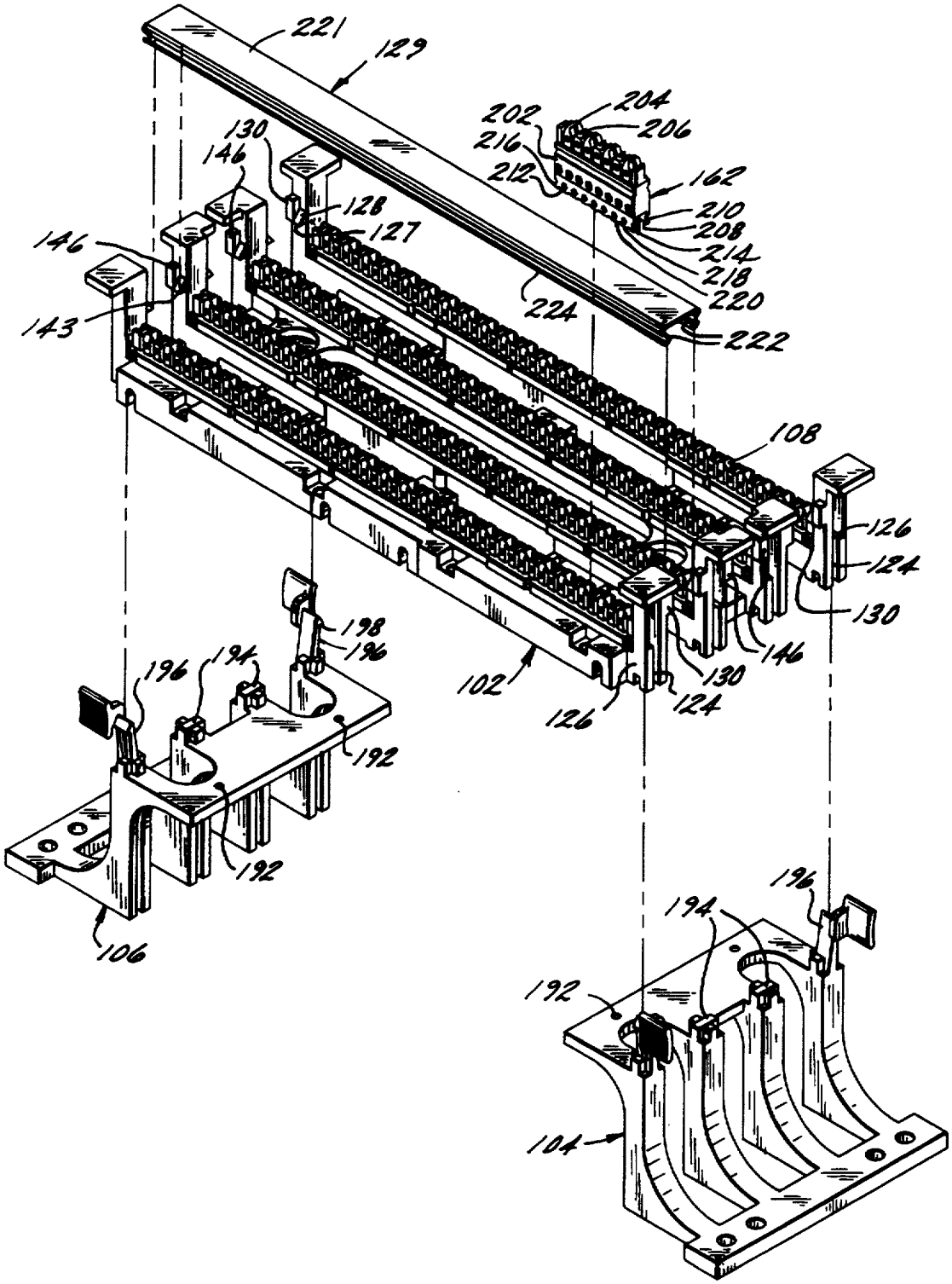
FIG. 6 is an exploded perspective view of a wiring block in accordance with the present invention.
Figure 7A:
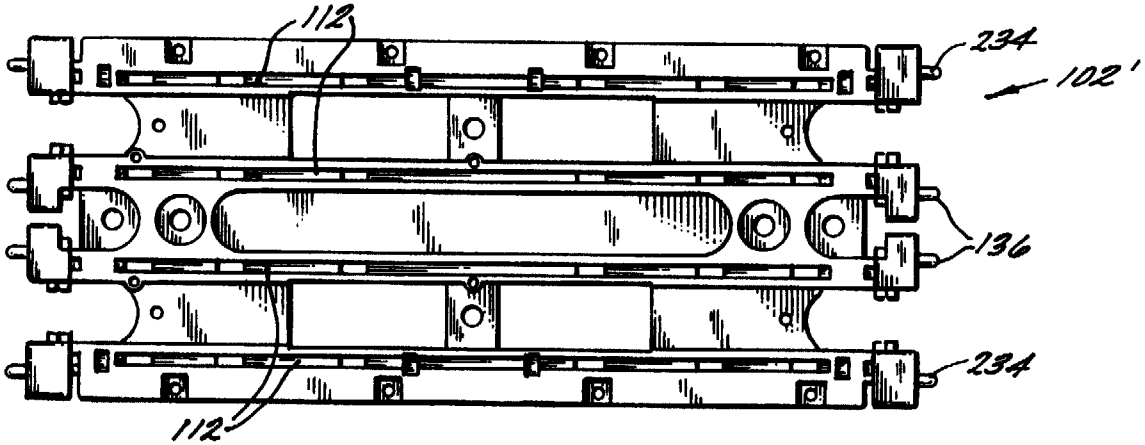
Figure 7B:
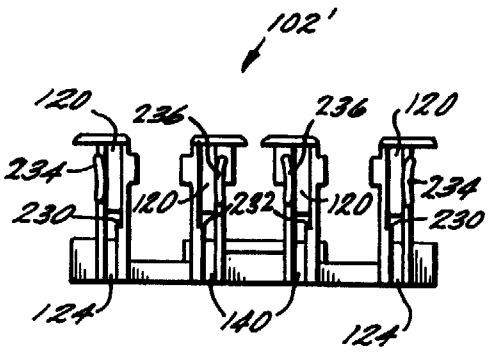
Figure 7C:
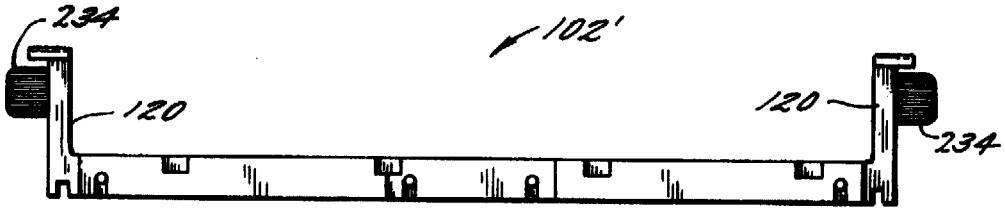

Referring to FIGS. 3A–C, base 102 includes an upper surface 110 with a plurality of longitudinally extending channels 112 therein. Each channel 112 has a plurality of rectangular openings 114 therethrough. Retaining ledges 115 are defined within opening 114 for retaining wiring strips 108 on base 102. At each end of base 102 in alignment with each channel 112 is an upright member 116. The outer upright members 118 each comprises a member 120 extending upwardly from base 102 and terminate in a generally rectangular platform 122. A slot 124 extends through a lower portion of member 120 and includes a perpendicular notch 125 at the lower end thereof. Notch 125 and slot 124 form a cross shaped opening which aids in the alignment and secure attachment of the corresponding leg assembly 104, 106. Also a retaining ledge 126 is defined at the inner facing surface of slot 124 for retaining the corresponding leg assembly 104, 106. Extending from one side of each member 120 is a retaining edge 127 with a cooperating angled surface 128. Also, a protuding member 130 extends from the same side of member 120 as does edge 127 and surface 128, with member 130 being adjacent to surface 128. Edge 127, surface 128 and member 130 provide means for retaining a designation strip 129 (FIG. 6) described hereinafter. The inner upright members 132 each comprises a member 134 extending upwardly from base 102 and terminating in a generally rectangular platfore 136 with an open portion 138. A slot 140 extends through a lower portion of member 134 and includes a perpendicular notch 141 at the lower end thereof. Notch 141 and slot 140 form a cross shaped opening which aids in the alignment and secure attachment of the corresponding leg assembly 104, 106. Also, a retaining ledge 142 is defined at the outer facing surfaces of slots 140 for retaining the corresponding leg assembly 104, 106. Extending from opposing sides of each member 134 are retaining edges 143 with a cooperating angled surface 144. Also, a protruding member 146 extends from the same sides of member 134 as does edge 143 and surface 144, with member 146 being adjacent to surface 144. Edge 143, surface 144 and member 146 provide means for retaining designation strip 129 (FIG. 6).

A plurality of openings defined by an accurate surface 148 are disposed at the ends of base 102 between selected channels 112. These openings provide an access for cables/wires that are to be connected to wiring block 100. An attachment hole 149 through base 102 is disposed near each surface 148 for an alternate removable attachment means for attaching leg assemblies 104 and 106 to base 102 (e.g. screws). Additional openings 150 between selected channels 112 also provide an access for these cables/wires. These opertings 150 are an important feature of the present invention as they provide for improved cable/wire management as compared to the aforementioned prior art.

Also base 102 has a plurality of mounting holes 152 through each side of base 102. Holes 152 correspond in location with the openings defined by surface 148 and opening 150. Holes 152 allow for lateral attachment of wiring block 100 to another wiring block or an adjacent surface at side wall 37 without the need for direct support of bottom surface 139. Further, if base 102 is to be used without leg assemblies 104 and 106, then mounting holes 154 along the edges of base 102 may be employed for attachment to a surface or mounting bracket along the length of wiring block 102.

Figure 4B:
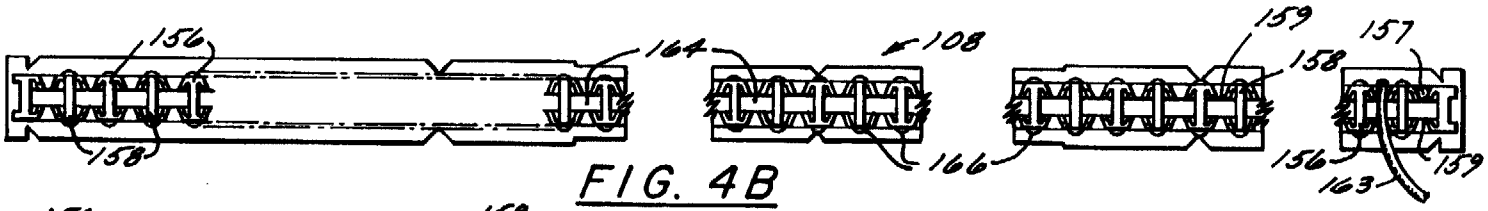
FIGS. 4A–B are views of a wiring strip of the wiring block of FIG. 2 whereto
Figure 4A:
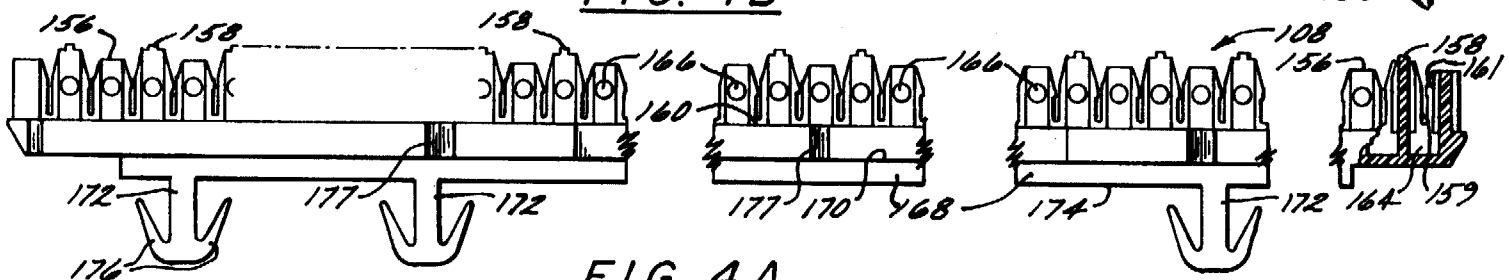

Referring to FIGS. 4A–B, wiring strip 108 has a plurality of spaced apart teeth 156, 158 along the length of its upper surface 160. Teeth 156 and 158 are separated by channels 159 with detent feature 161 on either side of opening 164. Channels 159 are defined by resilient side walls which extend inwardly towards opening 164 from both front and back surfaces of teeth 156 and 158. It will be appreciated that channels 157 are of an approximate size and shape to fixedly position an insulated wire 163 such that it extends across opening 164 for electrical connection to connector block 162 (FIG. 6, described hereinafter. Teeth 156 and 158 alternate in height and include tapered sides to prevent incorrect location and to facilitate interconnection of the teeth 156 and 158 and a row of beam contacts from a connector block 162. Strip 108 also has a row of rectangular openings 164 for accepting the beam contacts. To detachably interlock connector block 162 and wiring strip 108, an angled, cylindrical protrusion 166 on each side of teeth 156 and 158 and a corresponding plurality of openings in connector block 162 are provided. A longitudinal rail 168 depends downwardly from the lower surface 170 of strip 108. Rail 168 is received in corresponding channel 112 of base 102. A plurality of posts 172 extend downwardly from the lower surface 174 of rail 168. A pair of upwardly and outwardly extending resilient arms 176 depend from opposing sides of the lower most end of each post 172. Posts 172 and associated arms 176 pass through openings 114 of base 102, wherein arms 176 engage ledges 115, thereby retaining wiring strips 108 to base 102. Wiring strip 108 also includes a plurality of notches 177 at each side thereof.

Figure 5A:
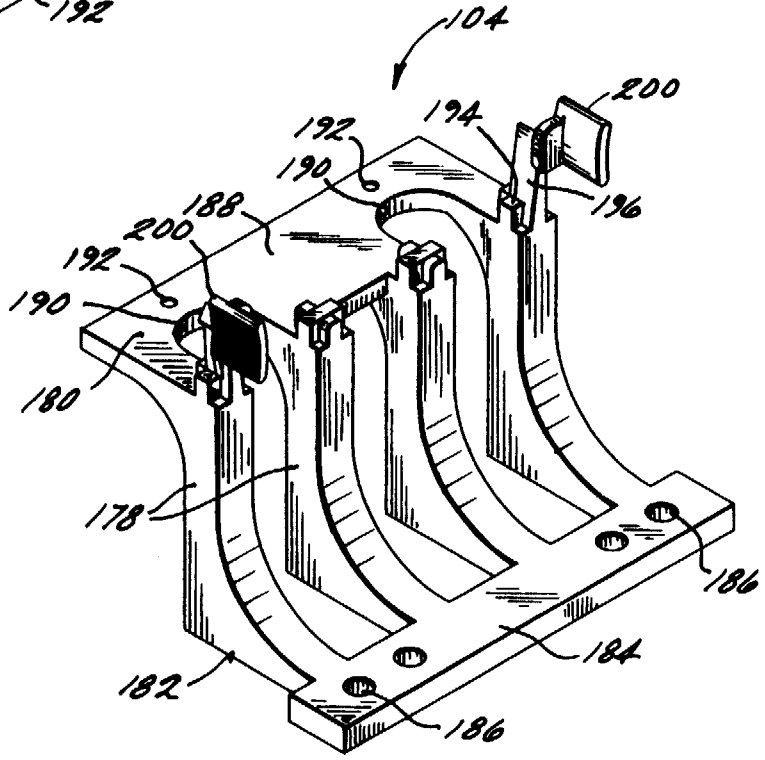
Figure 5B:
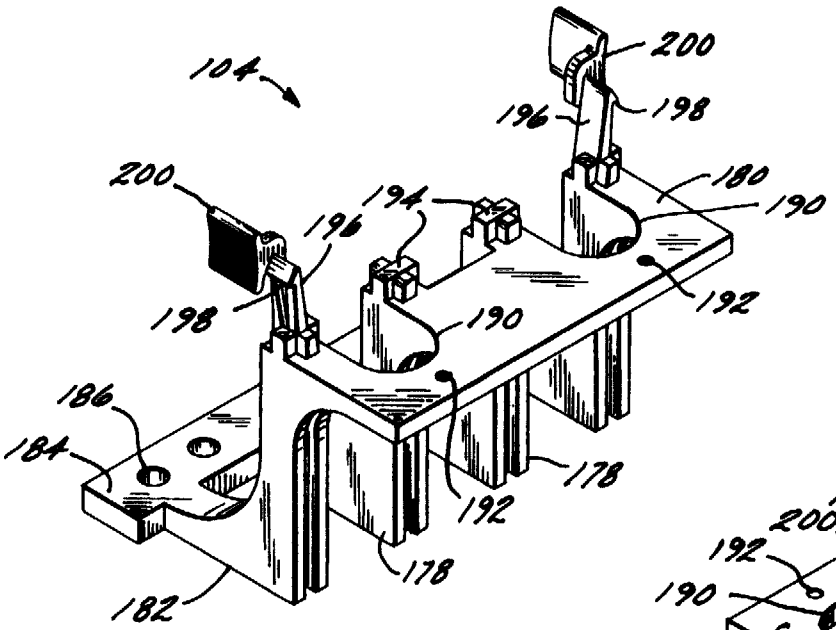

Referring to FIGS. 5A-B, leg assembly 104 is shown. Leg assembly 104 is the same as leg assembly 106 so that only assembly 104 will be described in detail herein. Leg assembly 104 comprise a plurality of leg members 178. The number of leg members 178 preferably corresponds to the number of wiring strips 108 that base 102 is designed to hold, in this example four. Each leg member 178 is generally "S" shaped having planer upper and lower surfaces 180 and 182 respectively. The lower end of member 178 are connected by a first generally rectangular mounting plate 184 having mounting hole 186 therethrough. The upper end of members 178 are connected by a second generally rectangular mounting plate 188. Plate 188 has a pair of accurate portions 190 which align with surfaces 148 on base 102 to provide an access for cables/wires that are to be connected to wiring block 100, as described hereinbefore. Also, a pair of attachment holes 192 are provided through plate 188 which align with holes 149 in base 102 to provide a more permanent means for attaching base 102 to the leg assembly if so desired.

A cross shaped profusion 194 depends upwardly from the upper planer surface 180 of each member 178. Protrusions 194 mate with the cross openings in base 102 formed by slots 124 and notches 125 and by slots 140 and notches 141. The leg assembly includes snap lock mounting means at each end thereof. The snap lock mounting means comprises a resilient arm 196 extending upwardly from respective end protrusions 194 in alignment with corresponding members 178. Arms 196 extend into corresponding slots 124 and 140 in base 102. The uppermost portion of arms 196 include a latch which faces outwardly away from the leg assembly as defined by a retaining edge 198. Edges 198 engage corresponding retaining edges 126 and 142 in slots 124 and 140 respectively of base 102. Further, a tab 200 depends from the upper end of each arm 196 for defeating the latch when detaching the leg assembly from base 102.

Referring primarily to FIG. 6 wiring block 100 comprises leg assemblies 104 and 106, base 102, wiring strips 108 and designation strip 129. Wiring block 100 is designed for use with a plurality of connector blocks 162 (only one connector block 162 is shown in FIG. 6 for purposes of illustration). When connecting leg assemblies 104 and 106 to base 102 arms 196 are urged into slots 124 which causes arms 196 to be forced inwardly until arms 196 snap back outwardly and edges 198 engage ledges 126. At the same time protrusions 194 are received in corresponding cross openings in base 102. Alternately leg assemblies 104 and 106 can be removably attached to base 102 by screws or the like through attachment holes 149 in base 102 and holes 192 in the leg assemblies.

Connector block 162 may be the wire termination block described in U.S. Pat. No. 4,964,812, incorporated herein by reference, or any other suitable termination block (e.g.. AT&T Technologies series 110C connector systems). Connector block 162 comprises a one piece molded housing 202. Housing 202 is substantially rectangular in shape and includes a plurality of spaced apart teeth 204 and 206 along the length of its upper surface. Teeth 204 and 206 alternate and are staggered in height to facilitate indexing of a set ofconductors in wire strain relief slots. Also, as is conventional with connecting blocks of this type, the teeth include tapered sides to facilitate entry of the set of wire conductors.

The lower portion of housing 202 includes a U-shaped cavity 208 formed by two depending sides 210 and 212 of housing 202. Within cavity 208 and spaced between the upper and lower surfaces of housing 202 is a planar molded floor having a plurality of rectangular openings therethrough. The openings are sized to receive and position individual beam contacts 214. The spaced openings continue through the upper portion of housing 202 through the staggered teeth 204, 206 to form opposed channels for receiving and positioning beam contacts 214 during assembly and the termination of insulated wires.

The lower edges 216 of sides 210 and 212 of housing 202 have a scalloped configuration comprised of spaced radii 218. Between each radius 218 is an opening 220 for engaging the angled cylindrical protrusions 166 on wiring strip 108 for fixedly attaching block 126 to strip 108.

Designation strip 129 comprise a preferably transparent member 221 having a length sufficient for being disposed between members 130 and 146 at opposing ends of base 102. Inwardly angled sides 222 depend from member 221 along the entire length thereof. Each side 222 terminates in a turned up portion 224. Strip 129 is pushed onto base 102 at surfaces 128 and 144 which urge resilient upright members 116 outwardly until upright members 116 snap back inwardly and portions 224 engage edges 127 and 143.

Referring to FIGS. 7A-C and 8, wherein like elements to the FIGS. 2-6 embodiment are numbered alike, the tabs for defeating the latch of the leg assemblies from the base are disposed on the base rather than on the leg assemblies, in accordance with a preferred embodiment. Leg assembly 104' (FIG. 8) is the same as leg assembly 104 (FIGS. 5A-B) except for the resilient arms 196 and the absence of the tabs. Leg assembly 104' comprises leg members 178 connected at their lower end by plate 184 and at their upper end by plate 188.

Cross shaped protrusions 194 depend upwardly from the upper surface of each member 178. Resilient arms 226 extend upwardly from respective end protrusions 194 in alignment with corresponding members 178. Arms 226 extend into corresponding slots 124 and 140 in base 102'. The upper most portion of arms 226 include a latch which faces inwardly away from the leg assembly as defined by a retaining edge 228. Edges 228 engage corresponding retaining ledges 230 and 232 in slots 124 and 140 of base 102. It will be appreciated that there are no tabs depending from arms 226.

Base 102' (FIGS. 7A-C) is the same as base 102 (FIGS. 3A-C) except fcr retaining edges 126 and 142 and the addition of tabs. Retaining ledges 230 are defined at the inner facing surfaces of slots 124 and retaining ledges 232 are defined at the outer facing surfaces of slots 140. Also tabs 234 are disposed at the outer facing surfaces of end members 120 and tabs 236 are disposed at the inner facing surfaces of inner members 140.

When connecting leg assemblies 104' and 106' to base 102' arms 226 are urged into slots 124 which causes arms 226 to be forced outwardly until arms 226 snap back inwardly and edges 228 engage ledges 230. The tabs for defeating the latch of the leg assemblies from the base are located such that, when pressed inward, resilient upright members 116 are deflected in a lateral direction; thereby disengaging latch edges 228 from base ledges 230 such that the base and legs may be lifted apart.

Figure 9:
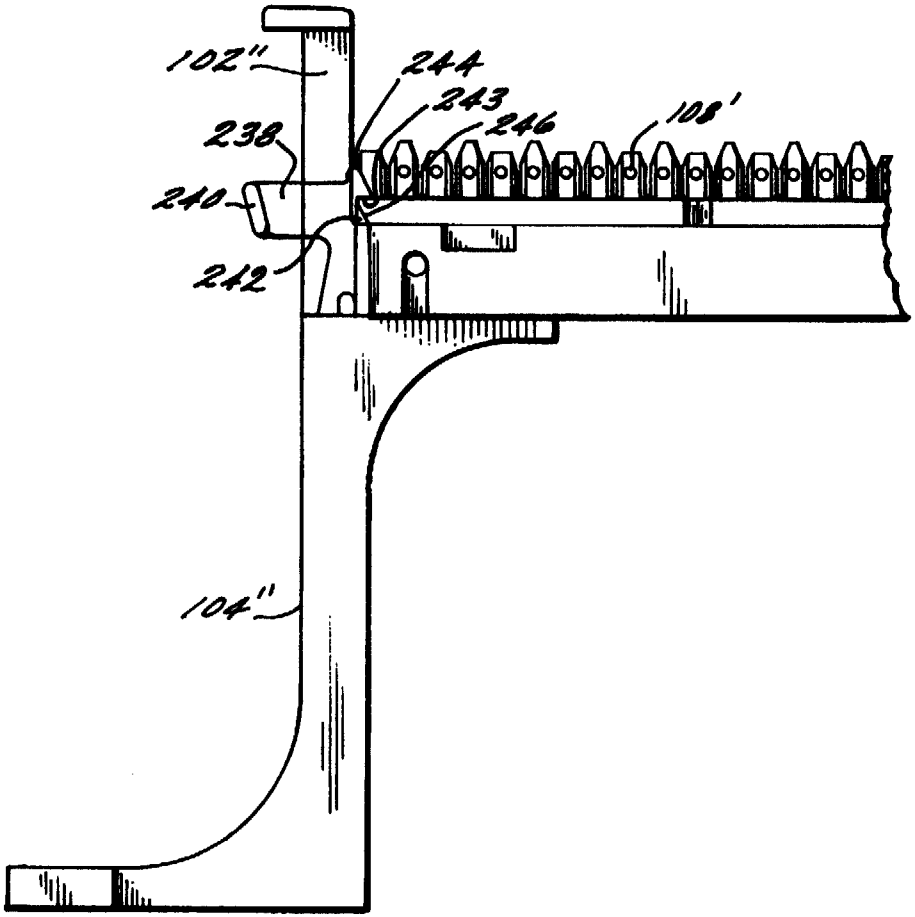
FIG. 9 is a partial side elevational view of a wiring block in accordance with still another embodiment of the present invention.
Figure 8:
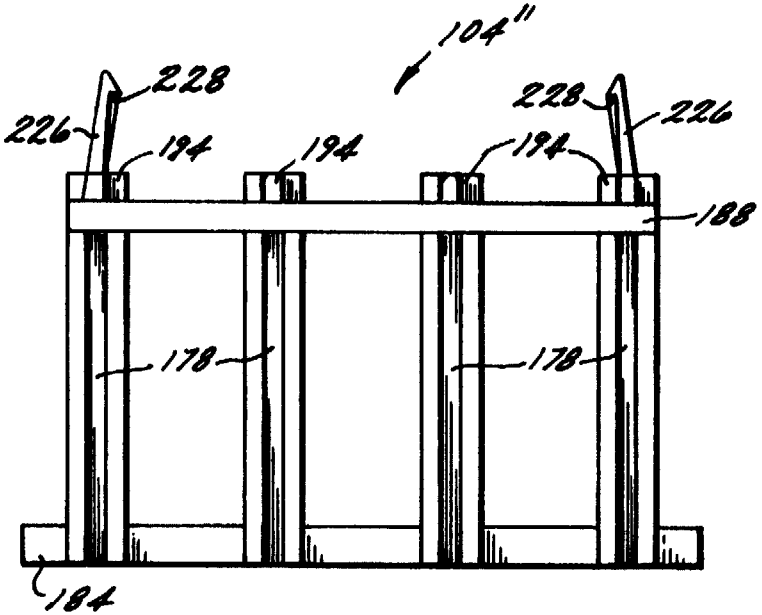
FIG. 8 is an end view of a leg assembly for use with the base of FIGS. 7A–C.

Referring to FIG. 9, whereto an alternate latch lock mounting means for attaching the wiring block 102"

having wiring strip 108 to leg assembly 104" is shown. In this embodiment, the wiring strip is the same as wiring strip 108 (FIGS. 4A–B). Resilient clip 238 is attached to leg 104" and extends upwardly therefrom. A tab 240 is provided on clip 238 to defeat a latch defined by surfaces 242–244. Surface 244 cooperates with an angled surface 246 of strip 108 when attaching leg 104" to base 102", whereby clip 238 is urged outwardly until clip 238 snaps back inwardly and edge 243 engages the upper surface of strip 108.

Figure 10:
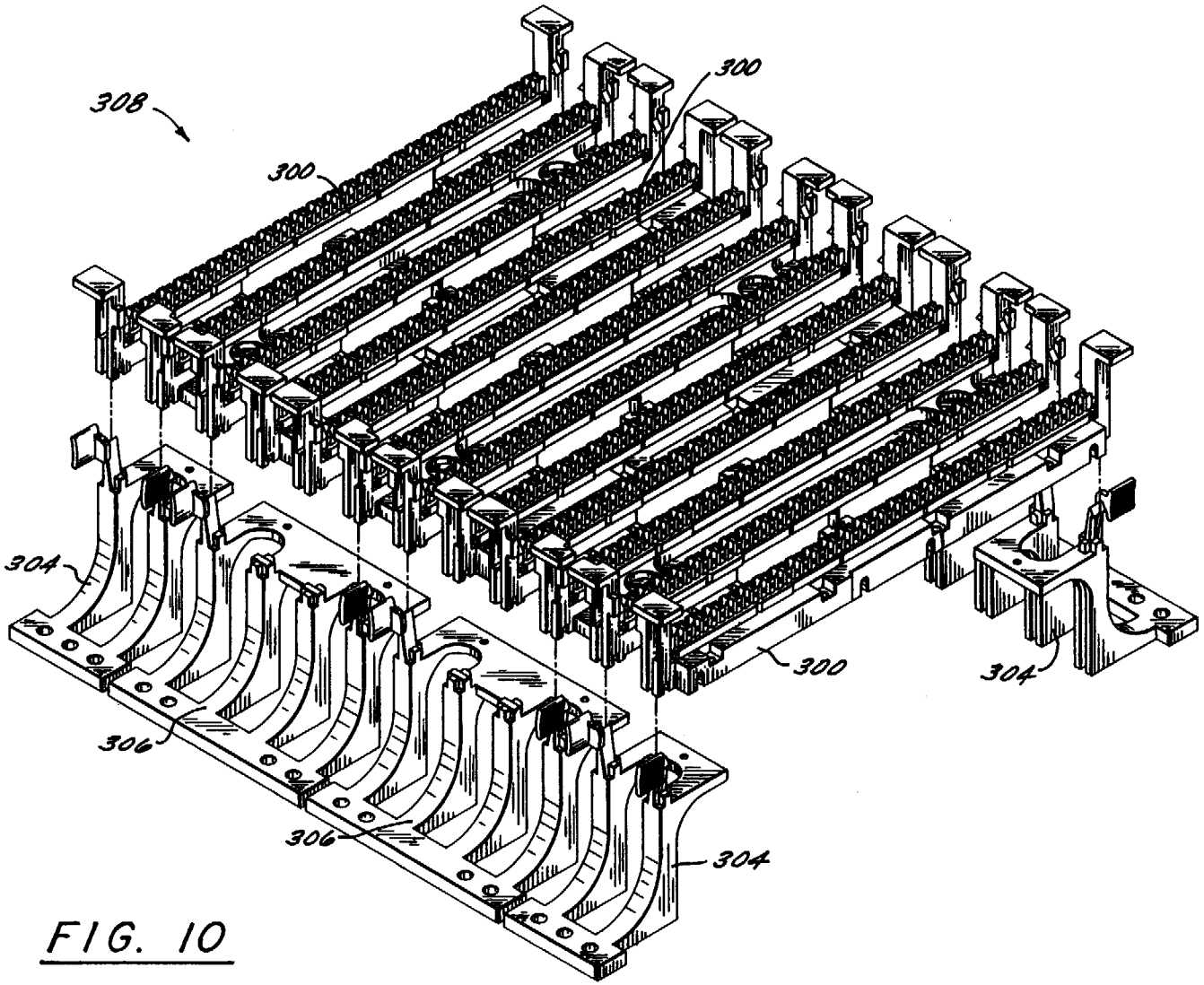
FIG. 10 is an exploded perspective view illustrating one possible configuaration of wiring blocks of the present invention.

Referring now to FIG. 10, an additional advantage of the embodiments shown in FIGS. 2–9 is shown, whereby configuring various combinations of standard wiring bases and legs, it is possible to configure a series of modular base assemblies with variable capacity in order to accommodate a needs of a given telecommunications wiring application or installation. An example of such is shown in FIG. 10, wherein combinations of four-row bases 300 and two and four leg leg assemblies 304, 306 respectively may be assembled in staggered order to produce a unitary twelve row assembly 308. Bases 300 and leg assemblies 304, 306 are of the same type described hereinbefore which is readily understood by one of ordinary skill in the art. The advantages of this capability include improved versatility and modularity over existing designs without the added expense of dedicated tooling and other associated costs required to process and stock non-standard wiring block configurations.

It will be appreciated that any number of wiring strips may be employed with an appropriate base as is well understood by one of ordinary skill in the art. Further, several embodiments for detachably mounting the leg assemblies to the base have been disclosed and this detachably is an important feature of the present invention. Also it is preferred that the base, wiring strips and leg assembly be comprised of a suitable molded plastic, as is known in the art.

While preferred embodiments have been shown and described, various moditications and substitutions may be made thereto without departing from the spirit and scope of the invention. Accordingly, it is to be understood that the present invention has been described by way of illustrations and not limitation.

What is claimed is:

1. A wiring block comprising:

at least one wiring strip, said wiring strip including, (1) a generally rectangular member having first and second pairs of opposing surfaces, and (2) a plurality of spaced apart teeth extending normally upward from one of said first surfaces, said teeth defining a plurality of wire retaining slots, said teeth having a channel in opposing sides thereof, said adjacent channels defining a plurality of openings;

a base having first and second pairs of opposing surfaces, said base having opposing ends, said at least one wiring strip removably disposed on one of said first surfaces; and leg means removably attached to said base at each of said ends.

2. The wiring block of claim 1 wherein each of said leg means is removably attached to said corresponding end of said base by snap lock mounting means.

3. The wiring block of claim 2 wherein said snap lock mounting means comprises:

at least one end of each of said leg means having a resilient arm disposed thereat, said resilient arm having a retaining edge defined thereon;

each of said ends of said base having at least one slot defined therein; and a retaining ledge defined within each of said slots of said base, wherein said edges of said leg means engage said ledges of said base.

4. The wiring block of claim 3 further comprising:

tab means disposed on said at least one arm, whereby actuation of said tab means separates the engagement of said edges of said leg means and said ledges of said base.

5. The wiring block of claim 3 wherein said base further comprises:

at least one upright member disposed at each of said ends of said base, said upright member having said slot therein; and tab means disposed on said at least one upright member, whereby actuation of said tab means separates the engagement of said edges of said leg means and said ledges of said base.

6. The wiring block of claim 1 wherein said removably attaching each of said leg means to said corresponding ends of said base comprises:

said base having at least one first attachment hole through said first surfaces near each of said ends;

a mounting member disposed at one end of each said leg means with at least one second attachment hole therethrough, said first and second attachment holes being in alignment; and screw means passing through said first and second attachment holes for removably attaching each of said leg means to said base.

7. The wiring block of claim 1 wherein said at least one wiring strip is disposed on said one of said first surfaces of said base by snap lock mounting means.

8. The wiring block of claim 7 wherein said snap lock mounting means comprises:

said at least one wiring strip further including, (1) a rail along the length of the other one of said first surfaces of said rectangular member, (2) a plurality of spaced post depending from a surface of said rail, and (3) a pair of resilient arms extending outwardly and upwardly from one end of said post at opposing sides thereof; and said base further including, (1) at least one corresponding longitudinal channel in said one of said first surfaces of said base, wherein said rail of said wiring strip is received, (2) a plurality of spaced holes through said first surfaces of said base within said channel, and (3) an opposing pair of retaining edges defined within each of said spaced holes, one end of each of said arms engaging said corresponding retaining edge within said spaced holes.

9. The wiring block of claim 7 wherein said snap lock mounting means comprises:

a resilient clip disposed on said base at each end thereof in alignment with said wiring strip, said resilient clip having a retaining edge for engaging said one of said first surfaces at each end of said wiring strip.

10. The wiring block of claim 1 wherein said at least one wiring strip comprises at least two spaced apart wiring strips; and wherein said base further comprises:

at least one access opening through said first surfaces of said base between said adjacent wiring strips to provide an access for wires for attachment to said wiring block.

11. The wiring block of claim 1 further comprising: said base including, (1) at least one upright member disposed at each of said ends of said base, (2) latch means depending from at least one side of each of said upright members; and (3) stop means associated with said latch means and depending from said at least one side of each of said upright members adjacent to said latch means; and at least one designation strip having side members with means for cooperating with said latch means for retaining said designation strip on said base, said designation strip having ends which abut said stop means for further retaining said designation strip on said base.

12. The wiring block of claim l.wherein said base further comprises:

a plurality of lateral mounting holes through at least one of said second surfaces to provide lateral attachment of said wiring block.

13. A wiring block comprising:

at least two spaced apart wiring strips, each of said wiring strips including, (1) a generally rectangular member having first and second pairs of opposing surfaces, and (2) a plurality of spaced apart teeth extending normally upward from one of said first surfaces, said teeth defining a plurality of wire retaining slots, said teeth having a channel in opposing sides of said teeth, said adjacent channels defining a plurality of openings;

a base having first and second pairs of opposing surfaces, said base having opposing ends, said at least two spaced apart wiring strips disposed on one of said first surfaces, said base having at least one access opening through said first surfaces of said base between adjacent said wiring strips, said at least one access opening comprising an opening of a size sufficient to provide access to a sufficient number of wires for wiring substantially all positions on said wiring strip; and leg means attached to said base at each of said ends.

14. The wiring block of claim 13 wherein each of said wiring strips is disposed on said one of said first surfaces of said base by snap lock mounting means.

15. The wiring block of claim 13 further comprising: said base including, (1) at least one upright member disposed at each of said ends of said base, (2) latch means depending from at least one side of each of said upright members: and (3) stop means associated with said latch means and depending from said at least one side of each of said upright members adjacent to said latch means; and at least one designation strip having side members with means for cooperating with said latch means for retaining said designation strip on said base, said designation strip having ends which abut said stop means for further retaining said designation strip on said base.

16. The wiring block of claim 13 wherein said base further comprises:

a plurality of lateral mounting holes through at least one of said second surfaces to provide lateral attachment of said wiring block.

17. A wiring block comprising:

at least one wiring strip, said wiring strip including, (1) a generally rectangular member having first and second pairs of opposing surfaces.

(2) a plurality of spaced apart teeth extending normally upward from one of said first surfaces, said teeth defiuing a plurality of wire retaining slots, said teeth having a channel in opposing sides of said teeth, said adjacent channels defining a plurality of openings, (3) a rail along the length of the other one of said first surfaces of said rectangular member, (4) a plurality of spaced post depending from a surface of said rail, and (5) a pair of resilient arms extending outwardly and upwardly from one end of said post at opposing sides thereof;

a base having first and second pairs of opposing surfaces, said base having opposing ends, said at least one wiring strip disposed on one of said first surfaces, said base further including, (1) at least one slot at each of said ends of said base, (2) a retaining ledge defined within each of said slots of said base, (3) at least one longitudinal channel in said one of said first surfaces of said base, wherein said rail of said wiring strip is received, (4) a plurality of spaced holes through said first surfaces of said base within said channel, and (5) an opposing pair of retaining edges defined within each of said spaced holes, one end of each of said arms engaging a corresponding retaining edge within said spaced holes; and leg means removably attached to said base at each of said ends, at least one end of each of said leg means having a resilient arm disposed thereat, said resilient arm having a retaining edge defined thereon, wherein said edges of said leg means engage said ledges of said base.

18. The wiring block of claim 17 further comprising:

tab means disposed on said at least one arm, whereby actuation of said tab means separates the engagement of said edges of said leg means and said ledges of said base.

19. The wiring block of claim 17 wherein said base further comprises:

at least one upright member disposed at each of said ends of said base, said upright member having said slot therein; and tab means disposed on said at least one upright member, whereby actuation of said tab means separates the engagement of said edges of said leg means and said ledges of said base.

20. The wiring block of claim 17 wherein said at least one wiring strip comprises at least two spaced apart wiring strips; and wherein said base further comprises;

at least one access opening through said first surfaces of said base between said adjacent wiring strips to provide an access for wires for attachment to said wiring block.

21. The wiring block in claim 17 further comprising:

a said base including, (1) at least one upright member disposed at each of said ends of said base, (2) latch means depending from at least one side of each of said upright members; and (3) stop means associated with said latch means and depending from said at least one side of each of said upright member adjacent to said latch means; and at least one designation strip having side members with means for cooperating with said latch means for retaining said designation strip on said base, said designation strip having ends which abut said stop means for further retaining said designation strip on said base.

22. The wiring block of claim 17, wherein said base further comprises:

a plurality of lateral mounting holes through at least one of said second surfaces to provide lateral attachment of said moving block.

*23. A wiring block comprising:*

*at least one wiring strip, said wiring strip including,*

*(1) a generally rectangular member having first and second pairs of opposing surfaces, and*

*(2) a plurality of spaced apart teeth extending normally upward from one of said first surfaces, said teeth defining a plurality of wire retaining slots, said teeth having a channel in opposing sides thereof, said adjacent channels defining a plurality of openings;*

*a base having first and second pairs of opposing surfaces, said base having opposing ends, said at least one wiring strip disposed on one of said first surfaces; and*

*leg means removably attached to said base at each of said ends.*

*24. The wiring block of claim 23 wherein each of said leg means is removably attached to said corresponding end of said base by snap lock mounting means.*

*25. The wiring block of claim 24 wherein said snap lock mounting means comprises:*

*at least one end of each of said leg means having a resilient arm disposed thereat, said resilient arm having a retaining edge defined thereon;*

*each of said ends of said base having at least one slot defined therein; and*

*a retaining ledge defined within each of said slots of said base, wherein said edges of said leg means engage said ledges of said base.*

*26. The wiring block of claim 25 further comprising:*

*tab means disposed on said at least one arm, whereby actuation of said tab means separates the engagement of said edges of said leg means and said ledges of said base.*

*27. The wiring block of claim 25 wherein said base further comprises:*

*at least one upright member disposed at each of said ends of said base, said upright member having said slot therein; and*

*tab means disposed on said at least one upright member, whereby actuation of said tab means separates the engagement of said edges of said leg means and said ledges of said base.*

*28. The wiring block of claim 23 wherein said removably attaching each of said leg means to said corresponding ends of said base comprises:*

*said base having at least one first attachment hole through said first surfaces near each of said ends;*

*a mounting member disposed at one end of each said leg means with at least one second attachment hole therethrough, said first and second attachment holes being in alignment; and*

*screw means passing through said first and second attachment holes for removably attaching each of said leg means to said base.*

*29. The wiring block of claim 23 wherein said at least one wiring strip is disposed on said one of said first surfaces of said base by snap lock mounting means.*

*30. The wiring block of claim 29 wherein said snap lock mounting means comprises:*

*said at least one wiring strip further including,*

*(1) a rail along with length of the other one of said first surfaces of said rectangular member,*

*(2) a plurality of spaced post depending from a surface of said rail, and*

*(3) a pair of resilient arms extending outwardly and upwardly from one end of said post at opposing sides thereof; and*

*said base further including,*

*(1) at least one corresponding longitudinal channel in said base, wherein said rail of said wiring strip is received,*

*(2) a plurality of spaced holes through said first surfaces of said base within said channel, and*

*(3) an opposing pair of retaining edges defined within each of said spaced holes, one end of each of said arms engaging said corresponding retaining edge within said spaced holes.*

*31. The wiring block of claim 29 wherein said snap lock mounting means comprises:*

*a resilient clip disposed on said base at each end thereof in alignment with said wiring strip, said resilient clip having a retaining edge for engaging said one of said first surfaces at each end of said wiring strip.*

*32. The wiring block of claim 23 wherein said at least one wiring strip comprises at least two spaced apart wiring strips; and*

*wherein said base further comprises:*

*at least one access opening through said first surfaces of said base between said adjacent wiring strips to provide an access for wires for attachment to said wiring block.*

*33. The wiring block of claim 23 further comprising:*

*said base including,*

*(1) at least one upright member disposed at each of said ends of said base,*

*(2) latch means depending from at least one side of each of said upright members, and*

*(3) stop means associated with said latch means and depending from said at least one side of each of said upright members adjacent to said latch means; and* at least one designation strip having side members with means for cooperating with said latch means for retaining said designation strip on said base, said designation strip having ends which abut said stop means for further retaining said designation strip on said base.

*34. The wiring block of claim 23 wherein said base further comprises:*

*a plurality of lateral mounting holes through at least one of said second surfaces to provide lateral attachment of said wiring block.*

*35. A wiring block comprising:*

*at least one wiring strip, said wiring strip including,*

*(1) a generally rectangular member having first and second pairs of opposing surfaces, and*

*(2) a plurality of spaced apart teeth extending normally upward from one of said first surfaces, said teeth defining a plurality of wire retaining slots, said teeth having a channel in opposing sides*

*thereof, said adjacent channels defining a plurality of openings;*

*a base having first and second pairs of opposing surfaces, said base having opposing ends, said at least one wiring strip disposed on one of said first surfaces; and*

*leg means attached to said base at each of said ends of said base by snap lock mounting means.*

*36. The wiring block of claim 37 wherein said snap lock mounting means comprises:*

*at least one end of each of said leg means having a resilient arm disposed thereat, said resilent arm having a retaining edge defined thereon:*

*each of said ends of said base having at least one slot defined therein; and*

*a retaining ledge defined within each of said slots of said base, wherein said edges of said leg means engage said ledges of said base.*

*37. The wiring block of claim 36 further comprising:*

*tab means disposed on said at least one arm, whereby actuation of said tab means separates the engagement of said edges of said leg means and said ledges of said base.*

*38. The wiring block of claim 36 wherein said base further comprises:*

*at least one upright member disposed at each of said ends of said base, said upright member having said slot therein: and*

*tab means disposed on said at least one upright member, whereby actuation of said tab means separates the engagement of said edges of said leg means and said ledges of said base.*

*39. The wiring block of claim 37 wherein said at least one wiring strip is disposed on said one of said first surfaces of said base by snap lock mounting means.*

*40. The wiring block of claim 39 wherein said snap lock mounting means comprises:*

*said at least one wiring strip further including,*

*(1) a rail along the length of the other one of said first surfaces of said rectangular member,*

*(2) a plurality of spaced post depending from a surface of said rail, and*

*(3) a pair of resilient arms extending outwardly and upwardly from one end of said post at opposing sides thereof; and*

*said base further including,*

*(1) at least one corresponding longitudinal channel in said one of said first surfaces of said base, wherein said rail of said wiring strip is received,*

*(2) a plurality of spaced holes through said first surfaces of said base within said channel, and*

*(3) an opposing pair of retaining edges defined within each of said spaced holes, one end of each of said arms engaging said corresponding retaining edge within said spaced holes.*

*41. The wiring block of claim 39 wherein snap lock mounting means comprises:*

*a resilient clip disposed on said base at each end thereof in alignment with said wiring strip, said resilient clip having a retaining edge for engaging said one of said first surfaces at each end of said wiring strip.*

*42. The wiring block of claim 35 wherein said at least one wiring strip comprises at least two spaced apart wiring strips; and*

*wherein said base further comprises:*

*at least one access opening through said first surfaces of said base between said adjacent wiring strips to provide an access for wires for attachment to said wiring block.*

*43. The wiring block of claim 35 further comprising:*

*said base including,*

*(1) at least one upright member disposed at each of said ends of said base,*

*(2) latch means depending from at least one side of each of said upright members, and*

*(3) stop means associated with said latch means and depending from said at least one side of each of said upright members adjacent to said latch means; and at least one designation strip having side members with means for cooperating with said latch means for retaining said designation strip on said base, said designation strip having ends which abut said stop means for further retaining said designation strip on said base.*

*44. The wiring block of claim 35 wherein said base further comprises:*

*a plurality of lateral mounting holes through at least one of said second surfaces to provide lateral attachment of said wiring block.*

* * * * *